Feb. 5, 1963 T. C. POULTER ETAL 3,076,408
CONTROLLED FRACTURING OF SOLIDS BY EXPLOSIVES
Original Filed Jan. 10, 1955 3 Sheets-Sheet 1

THOMAS C. POULTER,
EUGENE F. PONCELET,
INVENTORS

BY Lyon r Lyon
ATTORNEYS

THOMAS C. POULTER,
EUGENE F. POFCELET,
INVENTORS

Feb. 5, 1963 T. C. POULTER ETAL 3,076,408
CONTROLLED FRACTURING OF SOLIDS BY EXPLOSIVES
Original Filed Jan. 10, 1955 3 Sheets-Sheet 3

THOMAS C. POULTER,
EUGENE F. PONCELET,
INVENTORS

BY *[signature]*

ATTORNEYS 3,076,408
CONTROLLED FRACTURING OF SOLIDS
BY EXPLOSIVES
Thomas C. Poulter, Palo Alto, and Eugene F. Poncelet, Los Altos, Calif., assignors of one-half to Borg-Warner Corporation, Chicago, Ill., a corporation of Illinois, and one-half to Halliburton Company, a corporation of Delaware
Continuation of application Ser. No. 480,662, Jan. 10, 1955. This application June 11, 1958, Ser. No. 741,430
11 Claims. (Cl. 102—23)

This invention relates to the controlled fracturing of solids by means of explosives, and is directed more particularly to novel methods and procedures for fracturing, splitting or otherwise separating solid bodies along predetermined internal surfaces by kinetic energy developed by explosives. This application is a continuation of our copending U.S. application Serial No. 480,662 filed January 10, 1955, for "Controlled Fracturing of Solids by Explosives," now abandoned.

Heretofore, uncontrolled fracturing of solids by means of explosives has been accomplished by various methods such as shattering by brute force wherein large amounts of explosives are used, or by employing single shock pulse effects such as by expanding a core within the body and thus causing internal fractures by hoop stresses outside the core. In each of these and other known methods, however, only a small fraction of the energy of the explosive is effective for the intended purpose, and consequently large amounts of explosive are required. Such methods are usually accompanied by the scattering of many high-velocity fragments and often an intense and damaging blast effect. Furthermore, there is little or no control over the type or location of the fractures produced.

We have discovered that a body of steel, for example, can be split or fractured along a predetermined internal plane or surface by detonating in a particular manner a relatively small quantity of explosive in the form of a thin sheet in contact with the body. Generally speaking, such fracturing is now believed to be produced by developing at either side of the predetermined surface divergently directed components of kinetic energy of such extremely high order of magnitude in comparison with the cohesive energy of the material that it is literally torn apart along such surface. As will be understood from the following explanation, the kinetic energy is derived from shock pulses created in the body by the detonation of the explosive in contact therewith. A brief discussion of shock pulses in general, and particularly of shock pulses developed in a solid body by detonation of a charge of explosive in contact therewith, will assist in understanding the theory, principles and operation of the instant invention.

When a body of steel, for example, is dealt a sharp blow, whether by detonating a charge of explosive in contact therewith or by striking it with a high velocity projectile, a shock pulse is generated in the body, emanating from the point of impact. This shock pulse may be visualized as a rapidly expanding zone of high pressure, in which the particles of the material are animated by a certain velocity termed the particle velocity or mass-velocity. The boundary separating this zone of high pressure and particle velocity from the stationary material is called the shock front. The shock front is obviously not stationary, even in the case of a shock pulse generated only at a single point of origin. On the contrary, it propagates toward the motionless material at high velocity, termed the shock front velocity.

If, as in the instant case, the shock pulse is created by detonating a layer or sheet of explosive in contact with the body, the propagation of the detonation front through the explosive continues to initiate what may be visualized as a continuing series of shock pulses in the steel body, originating at progressive points along the explosive-steel interface and thus producing a shock front which propagates along such interface at the velocity of propagation of the detonation front in the explosive. As distinguished from this velocity of propagation of the shock front along the interface, the shock front velocity is preferably designated as its velocity measured in a direction perpendicular to the shock front rtaher than in a direction parallel to the interface.

The particle or mass-velocity must, however, be visualized and expressed more precisely as regards its direction and magnitude. If it is referred to the stationary material at the advancing side of the shock front, the mass-velocity in the zone of the shock pulse—i.e., behind the shock front—is oriented toward the shock front and perpendicular thereto. If the entire body, shock pulse and all, has a velocity relative to some outside frame of reference, this velocity component must be added geometrically to the mass-velocity and the shock front velocity, and so under such circumstances the absolute mass-velocity need not be perpendicular to the shock front. The significance of this distinction between absolute mass-velocity and the mass-velocity with reference to the stationary material at the forward side of the shock front, will be understood and appreciated as this explanation proceeds.

Previous attempts to relate explosive shock pulse effects to stresses have, we believe, failed for the reason that under shock pulses of the magnitude developed by detonation of explosives, the elastic behaviour of solids such as steel is believed to more closely approach that of liquids than of established concepts of behaviour of solids. We have found it not only more realistic and rational, but also more convenient by resort to the law of conservation of energy to visualize such shock pulse effects in terms of potential energy and kinetic energy. The equations of motion reveal that the potential energy is equal to the kinetic energy behind the shock front. As will be seen hereinafter, our theory of the mechanism of fracturing of solids by explosives involves the conversion of kinetic energy to potential energy and the subsequent re-conversion of potential energy to kinetic energy to effect the fracturing.

Our studies and experiments lead to the conclusion that fracture occurs as a result of the meeting of two distinctly different types of reflections of shock pulses—i.e., reflections from each other and reflections from free boundaries.

When a shock pulse in a steel body reaches a free boundary, such as the surface thereof opposite that contacted by the explosive creating the shock pulse, and assuming that such boundary is in contact with a substance of relatively negligible density such as air or possibly water, the pressure behind the shock front is relieved into such low-density medium. In order to relieve this pressure, the potential energy previously in the form of pressure behind the shock front is converted into kinetic energy, imparting to the material in the zone of relieved pressure a mass-velocity oriented toward the free boundary.

A new boundary or front is thus established between that part of the material behind the shock front which has had its potential energy in the form of pressure converted into kinetic energy in the form of velocity, and that part of the material behind the shock front which is as yet unaffected by the free boundary. This new boundary or front is termed a shock relief front, and the pulse is termed a shock relief pulse. The shock relief front extends approximately at the same angle to the free boundary as does the shock front, but inclined in the opposite direction, which accounts in part for its being referred to as a "reflection" of the shock pulse.

The mass-velocity of the material behind the shock relief front is away from the perpendicular to such front, considered with reference to the material at the forward side of such front—i.e., the material subject to the pressure and mass-velocity of the shock pulse. Also, the velocity of the shock relief front is perpendicular to such front and away from the free boundary of the body. However, inasmuch as the material behind the shock front has a mass-velocity of its own, inclined toward the free boundary, it will be seen that the mass-velocity of the material behind the shock relief front, which is oriented perpendicular to such front with reference to the material on the opposite side of such front, is given a component of velocity equal to, and oriented in the same direction as, that of such material on the opposite side of such front and hence its absolute velocity is oriented perpendicular to the free boundary of the body.

With reference now to reflections from a solid boundary, it should first be pointed out that the energy of shock pulses initiated by detonation of an explosive charge is so high that no real boundary exists that can remain rigid against such shock pulses. However, by opposing two shock pulses of equal energy, each may be caused to function as a perfectly rigid boundary to the other, so that the "collision" of two opposed shock pulses may be visualized as causing a reflection of the two pulses from each other.

In the case of the collision of two directly opposed shock pulses, the particles cannot reverse their velocity and recoil because of the successive impingement on each particle of the particle rearwardly of it. Hence as the forward motion of each particle is stopped, its kinetic energy is converted into potential energy in the form of pressure, as required by the law of conservation of energy. This pressure is considerably greater than twice that behind the shock fronts. This zone of extremely high pressure is in a true sense a pulse, termed receding shock pulse. The boundary between this pulse and the unconverted region of each of the shock pulses whose collision created it constitutes still another front, termed a receding shock front. The expression "receding" is deemed appropriate inasmuch as this front recedes from the virtual reflection surface as each successive particle collides with the preceding one and its forward motion ceases. It will be understood that two such receding shock fronts are formed, one on each side of the virtual reflection surface and receding therefrom in opposite directions.

Thus far there have been mentioned three distinct types of pulses—shock pulse, shock relief pulse, and receding shock pulse. To summarize the distinctive characteristics of these pulses, a shock pulse is characterized by high pressure and high mass-velocity oriented in the direction of advance of the shock front; a shock relief pulse is characterized by absence of pressure but with mass-velocity oriented away from its front and perpendicular to the free boundary of the body; and a receding shock pulse is characterized by the absence of mass-velocity in either direction perpendicular to the virtual reflection surface, but with extremely high pressure on the order of several times that prevailing in a shock pulse.

It is believed to be axiomatic that in order to fracture a solid body, such as a steel block, bar or plate, there must be imparted to the material at opposite sides of the virtual fracture surface, velocities in divergent directions with sufficient kinetic energy to overcome the cohesive energy of the material. Hence such fracture cannot be expected to occur by reason of the development of potential energy in the region of such virtual fracture surface, irrespective of the magnitude of such potential energy. However, conversion of such potential energy into kinetic energy acting divergently with respect to such virtual fracture surface may be expected to produce fracture.

In view of the foregoing, it therefore appears reasonable to assume that whereas the meeting of two opposed shock pulses and the consequent creation of a receding shock pulse will not develop fracture, the meeting of two relief pulses created by the incidence of the shock pulses on a free boundary can produce a fracture—this by reason of the fact that such relief pulses constitute zones of divergent kinetic energy. Further, the meeting of two relief pulses with the divergent fronts of a receding shock pulse can be expected to convert the potential energy of such receding shock pulse into divergent kinetic energy to produce fracture along the shock pulse reflection surface, which coincides with the collision site of the relief pulses.

The foregoing theoretical analysis is confirmed by data from experiments conducted by us, and by mathematical calculations. It is thus indicated that upon simultaneous initiation of detonation, at two spaced points, of a layer of explosive in contact with a body of material such as steel, having but a single free boundary located close enough to the area of initiation of the shock pulses to significantly affect the results, the three types of pulses mentioned above will interact in a precisely predictable manner to cause fracture of the body along a predetermined internal surface extending perpendicular to the explosive-metal interface and located exactly midway between the points of detonation initiation. Various modifications of this simplest of cases, such as by the introduction of one or more additional free boundaries within effective range of the area of shock pulse initiation, introduce complications into the predetermination of the location of the fracture surface, but within practical limits such predetermination is nevertheless possible.

Evidence of shock fracture phenomena other than those discussed above has also been adduced, some of which phenomena may contribute to a greater or less degree to fracturing of a body. Examples of such other phenomena are the "diamond cut" type of fracture produced by the meeting of the detonation fronts in the explosive in contact with the body, and fracture produced by the meeting of what have been termed "total relief pulses," each of which will be explained hereinafter.

At this point it is desired to have it understood that we do not wish to be restricted to the theories or explanations herein set forth as the basis of our invention, nor do we desire to have such theories and explanations, however sound and valid, construed as necessarily constituting a full and complete explanation of what occurs during the fracturing process. As explained and described in detail hereinafter, our invention resides in the novel manner of utilizing the energy of an explosive charge to cause controlled fracturing of a solid, such as a body of steel or the like, along a predetermined internal plane or surface.

It is therefore a general object of this invention to provide a novel method and means for controlled, localized fracturing of solids by explosives.

Another object of this invention is to provide a novel method and means for controlled fracturing of solids by explosives, characterized by maximum utilization of the energy of the explosive and the consequent minimizing of the amount of explosive required.

Yet another object of this invention is to provide a novel method and means for fracturing solids by explosives, characterized by a minimum of blast effect and flying fragments.

Still another object of this invention is to render it possible to fracture a solid along a preselected internal plane or surface by a process involving a usually simple and inexpensive technique.

Other objects and advantages of the invention will become apparent from the following description of a typical example and several modifications thereof, reference being had to the accompanying drawings wherein.

Figure 1:
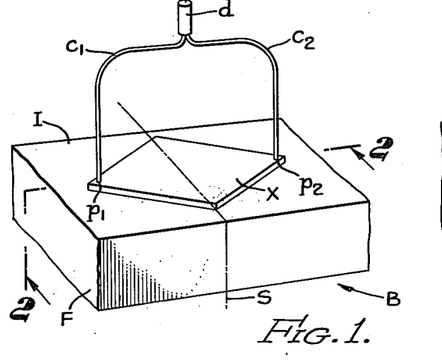
FIGURE 1 is a fragmentary perspective view of a block or bar of steel, for example, prepared for a fracturing operation.

As a typical example of a practical application of the principles of the instant invention, reference is had to FIGURE 1 of the drawing wherein there is shown a plate or block B of steel or similar material which it is desired to fracture along the virtual surface or internal plane S. In the practice of the invention a sheet or layer X of high explosive, such as that known as "C-2" or "C-3," is placed on the surface I of the body B, in intimate contact therewith. The sheet of explosive is preferably diamond-shaped with its transverse axis lying in the fracture plane or surface S.

A most important step in the practice of this instant invention is the simultaneous development of two detonation fronts in the explosive X. One way of accomplishing this is by initiating detonation of the explosive simultaneously at the points $p_1$ and $p_2$ at the longitudinal apices of the diamond. Such simultaneous detonation may be initiated by equal lengths of detonating cord $c_1$ and $c_2$ extending respectively from the points $p_1$ and $p_2$ to a detonator $d$ which may be a conventional electric blasting cap.

Upon simultaneous initiation of detonation of the explosive X at the points $p_1$ and $p_2$, two detonation fronts propagate through the explosive toward each other, to meet at the surface S. Detonation of the explosive in contact with the body B generates two shock pulses which propagate through the body, as explained in detail hereinafter with reference to FIGURES 2 through 7.

In the following description and explanation of the various pulses generated in the body B, and of their individual and distinctive pressure, velocity and energy characteristics, the following symbols are used and have the following respective definitions:

Fronts:
   $Fs$—shock front
   $Fr$—relief front
   $Frs$—receding shock front
   $Ftr$—total relief front
   $Frsr$—receding shock relief front Velocities:
   $Vsf$—shock front velocity
   $Vrf$—relief front velocity
   $Vs$—mass-velocity behind each shock front
   $Vr$—mass-velocity behind each relief front
   $Vra$—mass-velocity (absolute) behind each relief front
   $Vrs$—mass-velocity in receding shock pulse
   $Vrsr$—mass-velocity from conversion of potential energy in receding shock pulse to kinetic energy
   $Vf$—component of velocity $Vrsr$ effective to produce fracture
   $Vtr$—mass-velocity behind receding shock relief front
   $Vtra$—mass-velocity (absolute) behind receding shock relief front In order to distinguish between corresponding symbols associated with the two groups of pulses at opposite sides of the surface S, those to the left of such surface are designated by the suffix numeral "1," and those to the right are designated by the suffix numeral "2."

Figure 2:
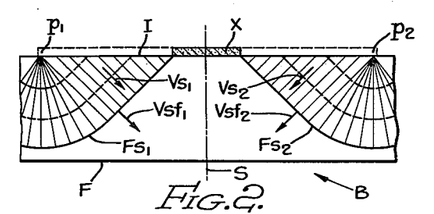
FIGURE 2 is a schematic view representing a central longitudinal section through the block of FIGURE 1 taken on line 2—2 depicting an early stage of propagation of opposed shock pulses through the body.

In FIGURE 2 the two shock fronts $Fs_1$ and $Fs_2$ consttute boundaries between the quiescent material as yet unactivated by the shock pulses and that behind each shock front. These fronts are advancing at the velocities and in the directions as indicated respectively at $Vsf_1$ and $Vsf_2$. The arrows $Vs_1$ and $Vs_2$ designate the respective orientations of the mass-velocities of the particles behind each front. For better visualization of these pulses the shade lines also indicate the orientation of the relative mass-velocities in different regions of the pulses. In this connection it will be noted that the propagation of the two detonation fronts in the explosive, from the points $p_1$ and $p_2$ toward the surface S, generates at the interface I two continuing series of shock pulses. At the interface I the shock fronts $Fs_1$ and $Fs_2$ keep pace with the detonation fronts in the explosive, thus giving the shock fronts the shapes indicated. It is seen from FIGS. 1 and 2 that the interface I and the free boundary F are a pair of opposed surfaces of the body B, which surfaces are intersected by the internal plane S and have substantially the same shape and area, i.e. are substantially coextensive.

In each of these shock pulses the energy is partly kinetic, in the form of mass-velocity, and partly potential, in the form of pressure, both being of extremely high order.

Figure 3:
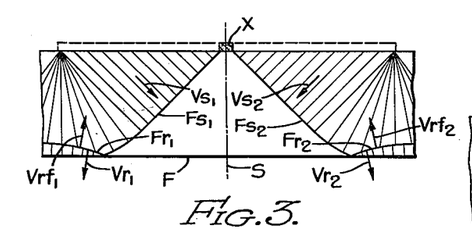
FIGURE 3 is a view similar to FIGURE 2, depicting a later stage immeditaely following initial development of relief pulses.

FIGURE 3 depicts the instantaneous condition at a very small interval of time after that illustrated in FIGURE 2. This point in the cycle has been selected to illustrate schematically an early stage of development of two relief pulses at the free boundary F. By "free boundary" is meant an external surface of the body B, separating the material of the body from some substance of comparatively negligible density, such as a vacuum, air, or possibly a liquid or a solid of very low density.

When the shock fronts $Fs_1$ and $Fs_2$ reach the boundary F the pressure behind each front is suddenly and substantially completely released. This pressure, representing potential energy, is converted into kinetic energy. The material particles at the boundary F are initially given a velocity perpendicular to the boundary F, and a new pulse termed a relief pulse is developed. The boundary separating this pulse from the shock pulse is termed the relief front, designated $Fr$. The two such fronts are indicated on the accompanying drawings as $Fr_1$ and $Fr_2$. These relief pulses may be visualized as progressively penetrating laterally into the respective shock pulses. Inasmuch as the shock pulses are advancing toward each other and toward the free boundary F, the relief fronts rapidly become oriented into the respective positions indicated at $Fr_1$ and $Fr_2$ in FIGURE 4—that is, at an angle to the boundary F approximately equal to but facing oppositely to the angle of the shock fronts $Fs_1$ and $Fs_2$ with such boundary incidence. Their orientation becomes stabilized in these relative positions.

Figure 4:
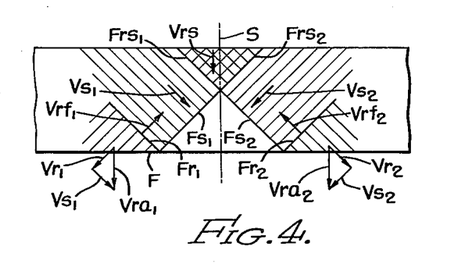
FIGURE 4 is a similar view but depicting a still later stage following meeting of the shock pulses and development of a receding shock pulse.

Referring to FIGURE 4, the mass-velocity of the particles behind the relief fronts is of necessity perpendicular to the relief fronts, with reference to the material at the advancing side of the relief fronts, as indicated at $Vr_1$ and $Vr_2$ and by the direction of the shade lines in the relief pulses. However, the material at the advancing side of the relief fronts is animated by the shock pulses with respective velocities indicated at $Vs_1$ and $Vs_2$. Consequently the absolute velocities of the particles behind the relief fronts, with reference to a relatively motionless frame of reference such as the free boundary F, are the respective vector sums of the two pairs of velocity components, $Vr_1$, $Vs_1$ and $Vr_2$, $Vs_2$. Thus, as shown by the vector diagram in FIGURE 4, the absolute mass-velocity $Vra_1$ behind the relief front $Fr_1$ is equal to the vector sum of the velocities $Vr_1$ and $Vs_1$, and it is oriented perpendicular to the free boundary F. Similarly, absolute velocity $Vra_2$ is equal to the vector sum of velocities $Vr_2$ and $Vs_2$ and is also oriented perpendicular to boundary F.

Thus far there have been considered the two distinct types of pulses—the two shock pulses converging on each other at an angle, and wherein the material particles are subjected to both pressure and velocity so that the total energy of these pulses is partly potential and partly kinetic, and the two relief pulses progressively relieving the pressure at the lower sides of the shock pulses and converting such pressure into particle velocity. The total energy of the relief pulses is thus kinetic.

With reference to the upper portion of FIGURE 3, it will be observed that the two detonation fronts in the explosive X and the two shock fronts are on the point of meeting at the surface S. When this collision occurs the particles lying in the shock front $Fs_1$ and having a velocity $Vs_1$ will collide with particles lying in the shock front $Fs_2$ and having a velocity $Vs_2$. If these particles were free to do so, they would recoil or bounce off each other and reverse the orientation of the horizontal components of their velocities. However, they are not free to recoil because as their forward motion is stopped they are immediately impinged upon from the rear by other particles. Their velocity in directions perpendicular to the surface S is thus reduced to zero and is converted into pressure. Particles immediately behind these leading particles are subjected to the same condition, and there are thus developed two inter-particle collision fronts, hereinafter designated as receding shock fronts $Frs_1$ and $Frs_2$, which progress in opposite directions from the surface S. This condition, with reference to a single line of particles, may be visualized as analogous to the head-on collision of two trains in a tunnel, wherein the two inter-car collision sites spread in opposite directions as each car is stopped by the motionless car ahead of it and imparts its energy thereto. It is obvious that as the two receding shock fronts spread away from the surface S, the cumulative conversion of the kinetic energy of the particles into potential energy develops an increased pressure within the receding shock pulse.

FIGURE 4 illustrates schematically an intermediate stage of the development of the receding shock pulse. In the foregoing discussion of this phenomenon, only the velocity components perpendicular to the surface S were considered inasmuch as the velocity components $Vrs$ parallel to the surface S remain unaffected.

Figure 5:
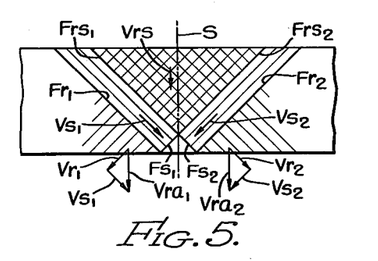
FIGURE 5 is a similar view depicting conditions just prior to meeting of the relief pulses with each other and with the receding shock pulse.

The receding shock pulse is thus seen to be a zone characterized by extremely high pressure and by mass-velocity oriented parallel to the virtual fracture surface S and away from the explosive-metal interface. The receding shock fronts advance laterally into the shock pulses at approximately the velocity of the shock fronts. Thus, as seen in FIGURE 5, the lateral encroachment of the receding shock pulse and the relief pulse upon opposite sides of the shock pulses progressively reduces the width of the shock pulses. Eventually this encroachment causes the shock pulses to disappear entirely, resulting in meeting and merging of the relief fronts $Fr_1$ and $Fr_2$ with the receding shock fronts $Frs_1$ and $Frs_2$, as illustrated in FIGURE 6.

In considering the effect of this meeting of the receding shock pulse and the relief pulses it should be borne in mind that the relief pulses are characterized by absence of pressure and with high particle velocity oriented away from the relief fronts, whereas the receding shock pulse is characterized by extremely high pressure and with particle velocity parallel to the fracture surface S. Up to this point these two zones have been isolated from each other by the shock pulses.

Upon meeting of the relief pulses with the receding shock pulse, the now composite fronts $Frs_1$, $Fr_1$ and $Frs_2$ and $Fr_2$ become boundaries separating zones of zero pressure and receding particle velocity from a zone of extremely high pressure and high particle velocity. The inevitable result is conversion of the high potential energy of the receding shock pulse into divergent kinetic energy expressed as high particle velocity in divergent directions from the fracture surface S.

Figure 6:
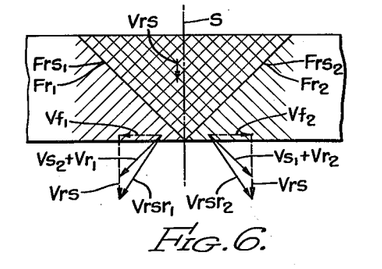
FIGURE 6 is a similar view depicting the instantaneous condition when fracture is initiated.

This is illustrated by the vector diagrams in the lower portion of FIGURE 6. As shown therein, the mass-velocity $Vr_1$ of the relief pulse is augmented by the mass-velocity $Vs_2$ of the opposite shock pulse which was partially converted into pressure in the receding shock pulse and which now reappears as velocity. The velocity component perpendicular to the composite front $Frs_1$, $Fr_1$ is thus $Vr_1+Vs_2$. To this velocity there is added geometrically the velocity $Vrs$ of the receding shock pulse, for a total velocity of $Vrsr_1$. The component of this velocity perpendicular to the virtual fracture surface S is indicated by the broken-line arrow designated $Vf_1$. This condition is duplicated in the opposite direction at the opposite side of the surface S.

Figure 7:
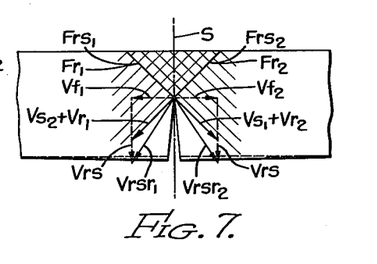
FIGURE 7 is a similar view depicting an intermediate stage of the fracture.

The oppositely oriented velocities $Vf_1$ and $Vf_2$ are imparted to the material on opposite sides of the surface S by divergently acting kinetic energy of such magnitude in comparison with the cohesive energy of the material that it is literally pulled apart to produce a fracture. Inasmuch as the virtual surface S represents the locus of the juncture points of the two relief pulses and the receding shock pulse, the fracture will progress from the boundary F along the surface S, as indicated in FIGURE 7.

Figure 8:
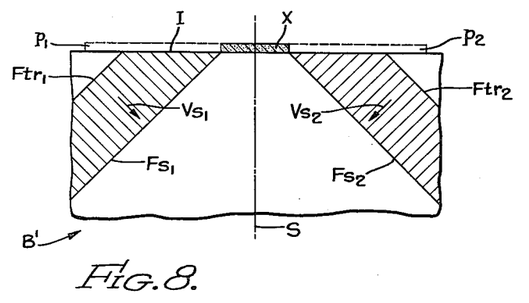
FIGURES 8, 9 and 10 schematically illustrate the development of another type of relief pulse at the explosive-metal interface.
Figure 9:
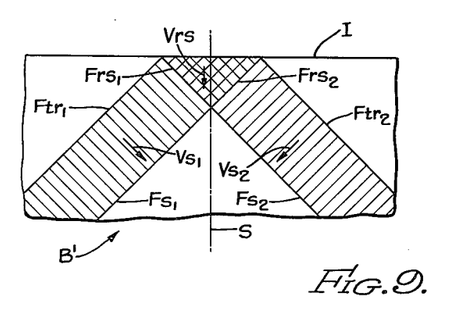
Figure 10:
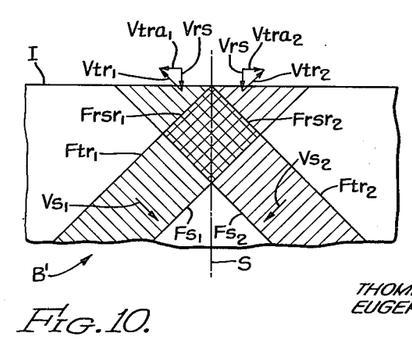

There is also experimental and mathematical evidence tending to indicate the formation of another and distinct type of relief pulse which, if conditions are such as to produce it, may function either independently of or in collaboration with the relief pulses described above, to effect fracture along the predetermined surface S, but initiating the fracture at a different point on the surface S. The initial phase of this other type of relief pulse is herein termed a "total relief pulse" inasmuch as it relieves not only the pressure but also the mass-velocity of the shock pulse which it follows. FIGURES 8, 9 and 10 illustrate schematically three stages in the development and functioning of a pair of these pulses.

Referring to FIGURE 8, the plate or block B' to be fractured along the surface S is similar to the block B of FIGURES 1 to 7 except that in order to simplify the description and explanation the lower free boundary F has been omitted along with any illustration of the formation and propagation of the relief pulses developed at such free boundary. The layer of explosive X has been detonated simultaneously at the two points $p_1$ and $p_2$ and two shock pulses have propagated through the body to the extent indicated by the shock fronts $Fs_1$ and $Fs_2$.

From studies of the detonation process as applied to high explosives such as cyclonite, "C-2," "C-3," etc., it is well established that immediately behind the detonation front, there is a reaction zone of finite width, in which the chemical reaction takes place and in which high temperature and high pressure prevail. Consequently that region of the surface I of the block B' which is exposed to the reaction zone of the detonation is subjected to the self-confinement pressure of the reaction and hence is not a "free boundary" in the sense of relieving the pressure or mass-velocity of the shock pulse. However, as the chemical reaction becomes completed and the gaseous products expand, the self-confinement pressure drops off rapidly, thus producing a fairly sharply defined rear boundary of the reaction zone. This rear boundary, when considered with reference to the condition prevailing at its rearward side, constitutes another front which moves along the surface I at the same velocity as the detonation front and hence follows it at a constant distance rearwardly thereof.

It is thus apparent that the region of the surface I at the rearward side of this front becomes a "free boundary" from which the pressure of the shock pulse may be released, as at the free boundary F in FIGURES 3 and 4. This release of pressure takes place progessively at fronts $Ftr_1$ and $Ftr_2$ which become oriented parallel to the respective shock fronts $Fs_1$ and $Fs_2$. The parallel relationship between these fronts produces, however, a different mass-velocity condition from that which prevails behind the relief fronts $Fr_1$ and $Fr_2$ in FIGURE 4. The pressure of the shock pulses tends to be converted into mass-velocities oriented perpendicular to the fronts $Ftr_1$ and $Ftr_2$, but in this case such orientation is directly opposite to the orientation of the respective mass-velocities $Vs_1$ and $Vs_2$ in the shock pulses, rather than perpendicular thereto as in FIGURE 4. Consequently the mass-velocities $Vs_1$ and $Vs_2$ are reduced to zero at fronts $Ftr_1$ and $Ftr_2$, and the regions behind such fronts are characterized by the total absence of both pressure and mass-velocity. Hence the designation of such pulses as "total relief pulses," and the fronts $Ftr_1$ and $Ftr_2$ as "total relief fronts."

Referring now to FIGURE 9, it will be observed that in this figure, as in FIGURE 4, the shock fronts $Fs_1$ and $Fs_2$ have met along the surface S to create a receding shock pulse defined by the fronts $Frs_1$ and $Frs_2$. At the instantaneous condition depicted by this figure the total relief fronts $Ftr_1$ and $Ftr_2$ have just met the receding shock fronts $Frs_1$ and $Frs_2$ at the surface I. Up to this point there has been no change in the character of the total relief pulses, and the high pressure prevailing in the receding shock pulse is still totally confined therein by the shock pulses and the detonation reaction pressure at the surface I. Beyond this point however, the interaction of the total relief pulses and the receding shock pulse gives rise to still another set of pulses.

It will be observed with reference to FIGURE 10 that as the total relief pulses $Ftr_1$ and $Ftr_2$ advance from the positions shown in FIGURE 9, they interact with the downwardly moving receding shock pulse to create two new fronts $Frsr_1$ and $Frsr_2$, termed receding shock relief fronts. These fronts separate the receding shock pulse from what were initially regions of the total relief pulses but which are characterized by mass-velocities induced relief of the pressure in the receding shock pulse, and hence are termed receding shock relief pulses.

The progressive exposure, at the fronts $Frsr_1$ and $Frsr_2$, of the particles subjected to the pressure of the receding shock pulse to regions of no pressure, converts the potential energy of such particles into kinetic energy in the form of mass-velocities $Vtr_1$ and $Vtr_2$ oriented perpendicular to such fronts and toward the regions of no pressure. Inasmuch as the receding shock pulse is characterized by a mass-velocity $Vrs$ downwardly parallel to the surface S, the absolute velocities at the fronts $Frsr_1$ and $Frsr_2$ are the vector sums of velocities $Vtr_1$ plus $Vrs$, and $Vtr_2$ plus $Vrs$, respectively equal to $Vtra_1$ and $Vtra_2$ as indicated by the vector diagrams in FIGURE 10. These absolute velocities are oriented substantially normal to the surface S and are effective to initiate fracture of the body along the surface S provided their kinetic energies are of sufficient magnitude in comparison with the cohesive energy of the material. As the juncture of the fronts $Frsr_1$ and $Frsr_2$ travels downwardly along the surface S, the fracture will progress along such surface.

Our above-described novel method of controlled fracturing of solids by explosives and the foregoing explanation of the theory thereof have, by experiments and mathematical calculations, been proven to be applicable not only to flat, parallel-surfaced bodies such as the plate or block B of FIGURE 1, but also to other shapes such as cylindrical bars, tubes and the like as well as to various conventional shapes of rolled mill stock such as channels, I-beams, H-beams etc.

Figures 11, 12, 13, 14, 15:
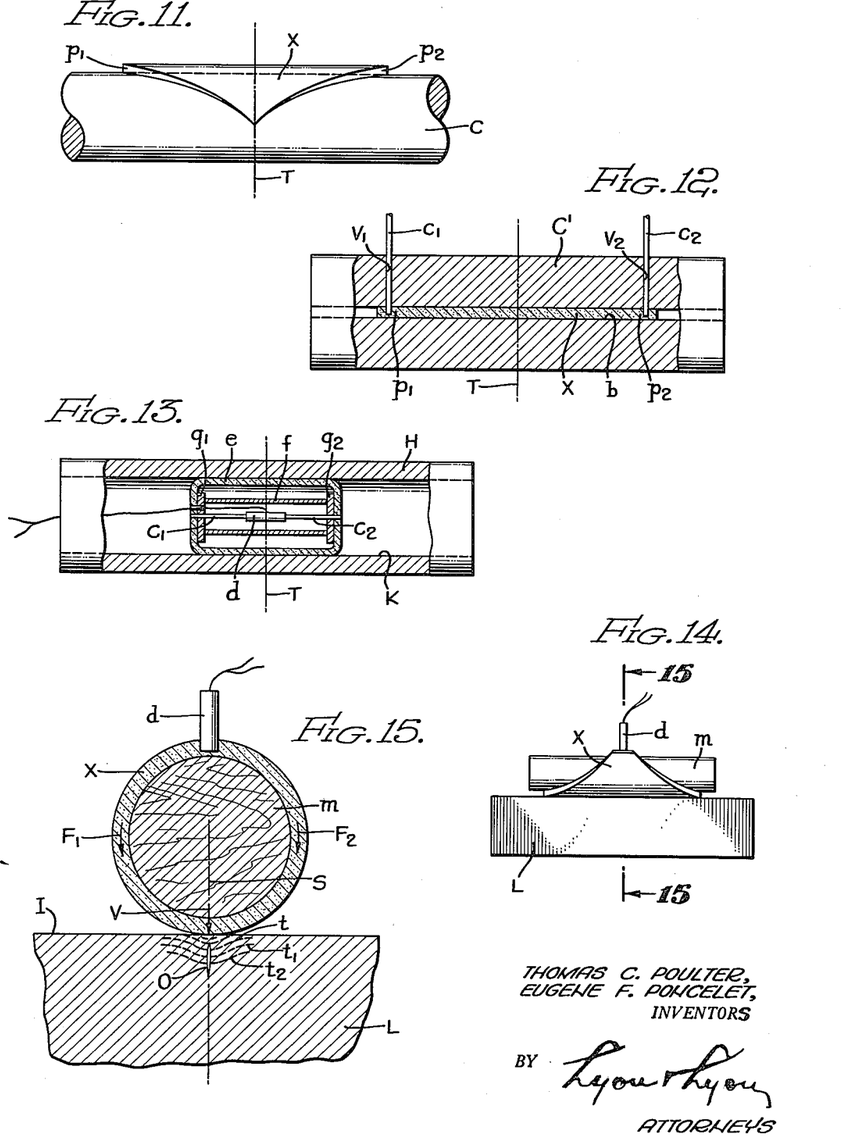
FIGURE 11 is a perspective view of a solid cylindrical bar of steel prepared for fracturing by an externally applied explosive charge.
FIGURE 12 is a view, partly in side elevation and partly in central longitudinal section, of a cylindrical bar prepared for fracturing by an explosive charge placed in an axial bore formed in the bar.
FIGURE 13 is a view, partly in side elevation and partly in central longitudinal section, of a hollow pipe or tube and an internal fracturing charge.
FIGURE 14 is a perspective view of an arrangement for producing a "diamond cut" type of fracture.
FIGURE 15 is a schematic illustration, on an enlarged scale, of the "diamond cut" fracture produced by the arrangement of FIGURE 14, in a section taken on line 15—15.

For example, FIGURE 11 illustrates a solid cylindrical bar C prepared for fracturing along the transverse surface T. In this instance the diamond-shaped sheet of explosive X is shaped to conform to the surface of the bar, and is detonated from the points $p_1$, $p_2$ simultaneously. In practice it has been found that best results are obtained if the transverse width of the diamond is approximately one-half the circumference of the bar.

FIGURE 12 shows a cylindrical steel bar C' prepared for fracturing or severing along the transverse surface T by an internal charge of explosive. In this instance the bar is axially bored at $b$ and is provided with two radial bores $v_1$ and $v_2$ spaced equal distances from the surface T. The axial bore is filled with explosive X between the radial bores and for a short distance therebeyond. The explosive may be of the plastic type and inserted in small amounts at a time from either end of the bore and firmly tamped to provide intimate contact of the explosive with the entire wall of the bore and also to ensure a solid cylinder of explosive. Equal lengths of detonating cord $c_1$ and $c_2$ are then inserted into the radial bores $v_1$ and $v_2$ with their inner ends embedded in the explosive in the bore $b$. The outer ends of the cords may be attached to a blasting cap as at $d$ in FIGURE 1 to provide simultaneous initiation of detonation of both cords and hence simultaneous detonation of the explosive X at the points $p_1$ and $p_2$. The peripheral surface of the bar provides a longitudinal external surface that surrounds the axial bore.

In this form of application of the invention a half-section in any axial plane corresponds to the longitudinal sections illustrated in FIGURES 2 to 7, the entire bar constituting as it does a solid of revolution of a rectangle about one longitudinal edge. Hence the pulse phenomena described and illustrated in FIGURES 2 to 7 also apply to this special case.

FIGURE 13 illustrates a modified case of the application shown in FIGURE 12. In this case the hollow pipe or tube H is provided with a bore K of such diameter in relation to the wall thickness that it would be impractical and at variance with the principles and objectives of the invention to fill the bore with explosive as in the case of FIGURE 12. In this instance, therefore, a relatively thin-walled cylinder $e$ of explosive is provided, of a size to fit snugly in the bore K, and is positioned with its central transverse plane coinciding with the desired location of the fracture surface T. Various arrangements for effecting initiation of detonation of the explosive simultaneously at both ends of the cylinder are possible. For illustrative purposes only, an electric blasting cap $d$ is shown mounted centrally within a metallic tube $f$ by two equal lengths of detonating cord $c_1$ and $c_2$, the tube $f$ serving as a shield to isolate the explosive $e$ from the lateral blast effect of the blasting cap and detonating cords. The tube $f$ is provided with end plates $g_1$ and $g_2$, over the outer faces of which the explosive $e$ extends to provide a detonation path from the outer ends of the detonating cords to the respective ends of the cylinder of explosive.

Inasmuch as the hollow tube H of FIGURE 13 constitutes a special form of the plate B of FIGURE 1, with the wall of the bore K corresponding to the surface I of the plate B, it will be apparent that the foregoing description and explanation of pulse phenomena with reference to FIGURES 2 to 7 also apply to FIGURE 13. Upon firing the blasting cap $d$ of FIGURE 13 the tube H will be severed along the surface T, with the fracture commencing at the outer periphery and progressing inwardly. In this case total relief pulses, as described in connection with FIGURES 8 to 10, may possibly also be developed at the surface K to initiate an outwardly progressing fracture at that surface.

In the description thus far, no reference has been made to still another type of fracture phenomenon which is incidental to, and to a degree augments, the fracture phenomena hereinabove described. When two detonation pulses are caused to propagate through a continuous charge of explosive toward each other they inevitably collide head-on. Upon such collision each detonation front constitutes an absolutely rigid and impenetrable boundary facing the other front so that the forward velocities of the explosive particles in each front are reduced to zero. Furthermore, the complete rearward confinement of such particles by other detonating particles in each front precludes any particle recoil. The only compliance afforded the particles is thus in a plane perpendicular to the direction of travel of the pulses at the instant of their collision.

Upon such collision the pressure developed at the collision site is considerably higher than the sum of the pressures prevailing in the individual fronts prior to their collision, and hence the conversion of this tremendous potential energy into kinetic energy produces particle velocities of extremely high magnitude. These particle velocities are confined to a very narrow region on each side of the collision plane, and hence their pressure effect on a body in contact with the explosive at the collision site is highly localized and directionalized. This extreme line pressure on the surface of the body induces what may be aptly termed a "diamond cut" of the same type as is produced in solids of great hardness and brittleness, such as glass or diamonds, by the use of a glazier's wheel or a diamond edge.

The production of a diamond cut is dependent only on the explosive being in contact with the body at the detonation front collision site, and is independent of whether the explosive also is in contact with the body for any substantial distance on either side of the collision site. In the latter case fracture in the same plane may result primarily from the development of shock pulses in the body, as described above, the diamond cut contributing to the complete fracture only to a minor extent in the case of a body of steel of substantial thickness.

In order to simplify and clarify our theory of the mechanism of diamond cut, it will be described with reference to an arrangement whereby only a diamond cut is produced. Such an arrangement is illustrated in FIGURES 14 and 15. As a convenient means of initiating propagation of two detonation pulses toward each other, and of providing contact of the explosive with the surface I of a body L only in the immediate vicinity of the site of collision of the detonation fronts, a diamond-shaped sheet of explosive X is wrapped around a cylindrical block $m$, herein shown as of wood. It will be understood that neither the material nor the particular shape of the block are important. One diagonal of the diamond-shaped explosive charge extends longitudinally of the block $m$ along one side thereof, and the circumferentially extending apices of the diamond are joined at the diametrically opposite side of the block to provide a common point of initiation. A blasting cap $d$ or other detonator is placed in detonating relation to the joined apices of the diamond, care being exercised to ensure that it is equidistant, in both circumferential directions, from the line of tangency of the explosive with the body L.

It will be apparent that upon firing the blasting cap $d$, two detonation pulses will propagate through the explosive X in the respective diretcions of the arrows $F_1$ and $F_2$ in FIGURE 15, and will meet at the plane S. The effect on the body L of the intense and highly localized line pressure developed in the plane S is indicated schematically in FIGURE 15. The physical evidence of the "diamond cut" effect appears as a pair of relatively smooth internal fracture surfaces, starting a short distance inwardly from the outer surface I and extending inwardly for a distance which, in a body of steel, is usually on the order of from one-quarter to three-eights of an inch. These surfaces are, beyond doubt, formed as a result of the development of a lens-shaped internal fracture such as is indicated at O in FIGURE 15.

Of several possible theories of the mechanism of formation of such a fracture, the one which seems to conform best to the preesnt body of knowledge as to the behavior of solids under heavy shock pulses from explosives is as follows: The extremely high kinetic energy of the explosive particles, concentrated in the plane S, imparts to such particles a velocity oriented in the direction of the arrow V and of such magnitude that the abruptly applied pressure exerted by such particles on the surface I of the body causes the surface layers of the material to yield and bend inwardly, as indicated schematically by the dotted lines $t$, $t_1$, $t_2$ in FIGURE 15. Such bending produces compressive stress at the outer or concave side of each layer and tensile stress at the inner or convex side of each layer. It is believed that at some point a short distance inwardly of the outer surface the tensile stress developed exceeds the cohesive strength of the material and a fracture is started. Because of the very short duration of the pulse, the stress is usually relieved before the fracture has progressed more than the above-mentioned one-quarter to three-eighths of an inch in steel.

It is thus apparent that such diamond cuts cannot be depended upon alone to completely fracture relatively thick bodies of material having cohesive strength on the order of that of steel. However, this phenomenon nevertheless occurs in conjunction with the shock puuse fracturing produced with the arrangements described above, and hence a description thereof is deemed appropriate. It should be pointed out that, if for any reason it should be desired, the diamond cut can be eliminated in any of the arrangements described above by inserting a barrier of inert material in the region of the collision site of the detonation fronts. This would prevent such collision of detonation fronts but would not materially interfere with or affect the development, propagation and meeting of the shock pulses, relief pulses and other pulses in the body which produce a fracture, as described with reference to FIGURES 1 to 13.

With reference to the quantity of explosive required in connection with the shock pulse method of fracturing illustrated in FIGURES 1 to 13, and the required length, thickness and shape of the explosive charge with relation to the physical properties, dimensions and configuration of the target to be fractured, the following relationships have been established and confirmed by numerous tests:

(1) The thickness of the explosive should be at least one-eighth of the thickness of the target to be fractured if high explosive such as cyclonite, C–2 or C–3 is used. The thickness of the explosive should in any event be sufficient to maintain high order detonation.

(2) The points of initiation of the detonation pulses in contact with the target, and hence the points of origin of the opposed shock pulses in the target, should, in the case of a flat-surfaced target as in FIGURE 1, be spaced on opposite sides of the fracture surface by a distance not less than three times the thickness of the target and also not less than one-half the length of the fracture, as measured along the explosive-metal interface. In the case of an external charge on a cylindrical target as in FIGURE 11, this distance can be somewhat less with relation to the thickness of the target because of the radially inward convergence of the shock pulses, but for best results this distance should not be less than the diameter of the target. In the case of an internal charge as in FIGURE 12, the spacing of each of the initiation points $p_1$ and $p_2$ from the fracture surface T should be at least equal to the diameter of the target, in view of the radially outward divergence of the shock pulses. In the case of a tubular body with wall thickness relatively small in comparison to the diameter, what has been said with respect to flat-surfaced objects will apply here.

(3) Subject to the foregoing, the configuration of the sheet of explosive is immaterial from a functional standpoint. The diamond shape has been employed for the reason that it affords two spaced initiation points at two of its apices, and an increasing width toward the transverse diagonal to provide for progressive lateral expansion of the detonation fronts as they approach each other. A rectangular sheet could be employed but the corner portions would serve no useful purpose and so would constitute an unnecessary waste of explosive.

A typical specific example is the form illustrated in FIGURE 12. Mild steel bars 3.0″ in diameter with axial bores of .270″ diameter, tamped with "C–3" explosive to a distance of about four inches on each side of the fracture plane T. The weight of explosive in this case is approximately 0.4 ounce, exclusive of the detonating cords. In view of this small amount of explosive, its confinement in the axial bore, and the fact that the major portion of its energy is expended in effecting the fracture, the blast effect is very negligible. Furthermore, there is no fragmentation of the steel bar, which is merely parted along the surface T.

From the foregoing description and explanation it will be apparent that we have invented a novel and greatly improved method, procedure and apparatus for effecting controlled fracturing of solids such as steel along predetermined surfaces, characterized by more efficient utilization of the energy of the explosive than has heretofore been possible, with consequent substantial reduction in the amount of explosive required, and characterized by a minimum of blast effect, thus permitting use of the method with a minimum of damage to adjacent objects.

In the foregoing description and explanation, reference has been made to initiation of detonation of the explosive substantially simultaneously at two points located approximately equidistant from the predetermined fracture surface. It is contemplated, however, that under certain circumstances it may be desired or preferred to provide a predetermined small time interval between detonation at the two points. In that event the intersection of the fracture surface with the explosive-to-metal interface will be generally hyperbolic in shape rather than a straight line, and will intersect a line extending between the two detonation points at a point offset from a median plane equidistant from such points, by a distance approximately equal to the product of the detonation rate of the explosive multiplied by one-half the aforesaid time interval. In all other planes the fracture surface will also be generally hyperbolic in shape. Otherwise, such non-simultaneous initiation of detonation at two points will develop pulse phenomena leading to fracture substantially as hereinabove described, and is within the scope of our invention.

It will be observed that in FIGURES 1 to 10 the explosive-to-metal interface I in the plane of section 2—2 is a straight line, and hence the fracture plane S is normal to both portions of the interface extending at opposite sides of the fracture plane. This is also the case in each of the other illustrated embodiments of the invention. However, it will be obvious that the invention is equally applicable to the fracturing of solids wherein the surface contacted by the explosive may be curved or may be composed of angularly related portions extending between the two detonation points. In such cases the fracture plane S will not be normal to the interface I, but will constitute a plane of symmetry of the shock fronts $Fs_1$ and $Fs_2$ (FIGURES 2 to 4).

The method of our invention has been found to be particularly applicable to the controlled fracturing of bodies of metal, such as steel, because of the property of such materials of flowing under extreme pressure. It is also applicable to some non-metallic materials which possess this property, such as certain plastics. It is therefore to be understood that the expression "other normally solid substance flowable under extreme pressure," as used in the appended claims, is intended to refer to all non-metallic substances which possess the aforesaid property and which otherwise behave in a manner similar to that of metals when subjected to a shock pulse developed by detonating a charge of explosive in contact therewith.

It should be borne in mind that in view of the time element and the magnitude of the forces and energies involved, it is extremely difficult if not impossible to detect, indicate or record with reliable accuracy the transient states which exist during various increments of time and at various points in a body being subjected to the fracturing method of this invention. Hence any explanation or theory of the phenomena is necessarily predicated on studies and analyses of ultimate results and on theoretical and mathematical analyses. The theories set forth herein are now believed by us to represent correct and valid explanations of the pulse phenomena, but for the above reasons they should not be applied in a limiting or restrictive sense to either the operativeness or the scope of the invention, the operativeness and effectiveness of which have been established irrespective of the validity of any theories.

For purposes of simplifying and clarifying the illustration and description of the method and of the present theories of pulse formation and propagation and conversions of energy, reference has been made only to simple, typical situations and applications. It is to be understood, however, that the invention is not limited to the applications and arrangements herein specifically described, but is of the full scope of the appended claims.

We claim:

1. A method of fracturing along a predetermined internal plane a body of metal or other normally solid substance flowable under extreme pressure, comprising the steps of covering a portion of a surface of the body normal to said plane with a layer of explosive extending on opposite sides of said plane in continuous substantial contact with said portion, the breadth of said layer adjacent said plane being not less than one-half the length of the fracture as measured along said surface, and initiating detonation of the explosive simultaneously at points equidistant from said plane at opposite sides thereof, to effect fracturing of said body substantially solely along said internal plane.

2. A method of fracturing along a predetermined internal plane a body of metal or other normally solid substance flowable under extreme pressure, said body having a pair of opposed substantially coextensive surfaces intersected by said internal plane, comprising the steps of covering a portion of one of said surfaces normal to said plane with a layer of explosive extending on opposite sides of said plane in continuous substantial contact with said portion, the breadth of said layer adjacent said plane being not less than one-half the length of the fracture as measured along said one surface, positioning said body so that said other of said surfaces forms a free boundary, and initiating detonation of the explosive simultaneously at points equidistant from said plane at opposite sides thereof, to effect fracturing of said body substantially solely along said internal plane.

3. A method of fracturing along a predetermined internal plane a body of metal or other normally solid substance flowable under extreme pressure, comprising the steps of covering a portion of a surface of the body normal to said plane with a layer of explosive extending on opposite sides of said plane in continuous substantial contact with said portion, the breadth of said layer adjacent said plane being not less than one-half the length of the fracture as measured along said surface, and initiating detonation of the explosive simultaneously at points equidistant from said plane at opposite sides thereof and at a distance from said plane not less than the thickness of said body as measured normal to said layer, to effect fracturing of said body substantially solely along said internal plane.

4. The method of fracturing substantially along a predetermined internal plane, a body of metal or other normally solid substance flowable under extreme pressure, comprising the steps of arranging a substantially diamond-shaped layer of explosive in continuous substantial contact with a surface of said body with one diagonal of said diamond extending in said plane, and initiating detonation of said explosive simultaneously at the extremities of the other diagonal of said diamond, to effect fracturing of said body substantially solely along said internal plane.

5. The method of fracturing substantially along a predetermined internal plane, a body of metal or other normally solid substance flowable under extreme pressure, said body having a pair of opposed substantially coextensive surfaces intersected by said internal plane, comprising the steps of arranging a substantially diamond-shaped layer of explosive in continuous substantial contact with one of said surfaces of said body with one diagonal of said diamond extending in said plane, positioning said body so that said other of said surfaces forms a free boundary, and initiating detonation of said explosive simultaneously at the extremities of the other diagonal of said diamond, to effect fracturing of said body substantially solely along said internal plane.

6. The method of fracturing substantially along a predetermined transverse internal plane a solid cylindrical body of metal or other normally solid substance flowable under extreme pressure, comprising the steps of placing a layer of explosive in contact with the cylindrical surface of said body, said explosive extending longitudinally on opposite sides of said plane and extending circumferentially in said plane a distance approximately equal to one-half the circumference of said body, and initiating detonation of said explosive simultaneously at points approximately equidistant from said plane at opposite sides thereof.

7. The method of fracturing substantially along a predetermined transverse internal plane a solid cylindrical body of metal or other normally solid substance flowable under extreme pressure, comprising the steps of placing a layer of explosive in contact with the cylindrical surface of said body, said explosive extending longitudinally on opposite sides of said plane a distance not less than the diameter of said body and extending circumferentially in said plane a distance approximately equal to one-half the circumference of said body, and initiating detonation of said explosive simultaneously at points approximately equidistant from said plane at opposite sides thereof.

8. The method of fracturing substantially along a predetermined transverse plane a tubular body of metal or other normally solid substance flowable under extreme pressure, comprising the steps of arranging a layer of explosive in continuous substantial contact with the inner wall of said body, said explosive extending longitudinally on opposite sides of said plane and extending circumferentially in said plane throughout the inner circumference of said body, and initiating detonation of said explosive simultaneously at points spaced approximately equidistant from said plane at opposite sides thereof, the quantity of said explosive being selected and the arrangement thereof being made to provide maintenance of detonation therein and to effect fracturing of said body substantially solely along said plane.

9. A method of fracturing along a predetermined virtual internal surface a body of metal or other normally solid substance flowable under extreme pressure, comprising the steps of covering a portion of a surface of the body transverse to said virtual surface with a layer of explosive extending on opposite sides of said virtual surface in continuous substantial contact with said portion, the breadth of said layer adjacent said virtual surface being not less than one-half the length of the fracture as measured along said surface and the thickness of said layer being substantially one-eighth the thickness of said body and sufficient to maintain high order detonation; and, initiating detonation of the explosive at locations spaced from said virtual surface at opposite sides thereof at times dependent upon the spacing of said locations from said virtual surface to cause the detonation fronts to collide at said virtual surface, to effect fracturing of said body substantially solely along said virtual surface.

10. The method of fracturing substantially along a predetermined transverse internal plane a cylindrical body of metal or other normally solid substance flowable under extreme pressure, comprising the steps of providing in the body an axial bore having a diameter relatively small with respect to the diameter of the body; filling said bore, solely between locations on opposite sides of said internal plane and spaced from said internal plane a distance substantially equal to the diameter of said body, with high explosive material in continuous intimate contact with the wall of said bore to form an explosive column; positioning said body so that the portion of the external surface thereof that surrounds said explosive column forms a free boundary; and simultaneously initiating detonation of said explosive column substantially at the ends thereof.

11. A method of fracturing along a predetermined internal plane a body of metal or other normally solid substance flowable under extreme pressure, comprising the steps of covering a portion of the surface of the body normal to said plane with a layer of explosive extending on opposite sides of said plane in continuous substantial contact with said portion, the breadth of said layer adjacent said plane being not less than one-half the length of the fracture as measured along said surface, and initiating detonation of the explosive simultaneously at points equidistant from said plane and spaced on opposite sides of said plane by a distance not less than three times the thickness of said body at said internal plane and also not less than one-half the length of said fracture as measured along the explosive-metal interface, to effect fracturing of said body substantially solely along said internal plane.

References Cited in the file of this patent

UNITED STATES PATENTS

| | | |
|---|---|---|
| 1,531,555 | Harris et al. | Mar. 31, 1925 |
| 2,163,462 | Holran et al. | June 20, 1939 |
| 2,679,783 | Smith | June 1, 1954 |
| 2,703,297 | Mac Leod | Mar. 1, 1955 |
| 2,774,306 | Mac Leod | Dec. 18, 1956 |
| 2,775,940 | Klotz | Jan. 1, 1957 |

UNITED STATES PATENT OFFICE
CERTIFICATE OF CORRECTION

February 5, 1963

Patent No. 3,076,408

Thomas C. Poulter et al.

It is hereby certified that error appears in the above numbered patent requiring correction and that the said Letters Patent should read as corrected below.

Column 3, line 6, for "the" read -- and --; column 9, line 67, before "relief" insert -- by --.

Signed and sealed this 3rd day of September 1963.

(SEAL)
Attest:

ERNEST W. SWIDER
Attesting Officer

DAVID L. LADD
Commissioner of Patents